United States Patent
Ge

(10) Patent No.: US 10,040,476 B2
(45) Date of Patent: Aug. 7, 2018

(54) AUTONOMOUS STEERING SYSTEM FOR AN ARTICULATED TRUCK

(71) Applicant: Caterpillar Inc., Peoria, IL (US)

(72) Inventor: Xinyu Ge, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 29 days.

(21) Appl. No.: 15/341,582

(22) Filed: Nov. 2, 2016

(65) Prior Publication Data

US 2018/0118256 A1    May 3, 2018

(51) Int. Cl.
*B62D 6/00*    (2006.01)
*B62D 12/00*   (2006.01)

(52) U.S. Cl.
CPC ............... *B62D 6/00* (2013.01); *B62D 12/00* (2013.01)

(58) Field of Classification Search
CPC .................................. B62D 6/00; B62D 12/00
See application file for complete search history.

(56) References Cited

U.S. PATENT DOCUMENTS

| | | | |
|---|---|---|---|
| 4,802,545 A | 2/1989 | Nystuen et al. | |
| 5,244,226 A * | 9/1993 | Bergh | B62D 13/04 280/426 |
| 5,544,475 A * | 8/1996 | Skibo | A01D 67/005 56/15.5 |
| 7,431,620 B1 * | 10/2008 | Harley | B63H 5/125 440/53 |
| 2014/0300082 A1 | 10/2014 | Szabo | |
| 2015/0122560 A1 | 5/2015 | Elrabaa | |
| 2016/0001705 A1 | 1/2016 | Greenwood et al. | |
| 2016/0057004 A1 | 2/2016 | Ge | |
| 2016/0280267 A1 | 9/2016 | Lavoie et al. | |

FOREIGN PATENT DOCUMENTS

| | | |
|---|---|---|
| DE | 19526702 A1 | 2/1997 |
| WO | 2007137970 | 12/2007 |
| WO | 2015169449 A1 | 11/2015 |

* cited by examiner

*Primary Examiner* — Richard M Camby
(74) *Attorney, Agent, or Firm* — Miller, Matthias & Hull; Steve D. Lundquist

(57) ABSTRACT

A control system for a steering a work machine is disclosed. The control system may include a steering input device configured to steer a lead machine module and an articulation module disposed between the lead machine module and a trailing machine module. The control system may further include a first articulation cylinder and a second articulation cylinder configured to actuate between a first and second cylinder first position and a first and second cylinder second position. Furthermore, an electronic controller in communication with the first and second articulation cylinders and programmed to transmit a control signal such that the first actuation cylinder actuates between the first actuation cylinder first position and the first actuation cylinder second position and the second actuation cylinder actuates between the second actuation cylinder first position and the second actuation cylinder second position.

17 Claims, 5 Drawing Sheets

AUTONOMOUS STEERING SYSTEM FOR AN ARTICULATED TRUCK

FIELD OF THE DISCLOSURE

The present disclosure relates generally to steering systems and, more particularly, relates to an automatic steering control system and method for steering and maneuvering an articulated truck.

BACKGROUND OF THE DISCLOSURE

Work machines, such as articulated trucks, off-road machines, on-road machines, motor graders, dozers, and the like may be used in mining, construction, agriculture, petroleum, and other such applications. During operation, the work machine may need to maneuver around a work site which may include narrow pathways and many tight and twisting turns. In one non-limiting example, the work machine may include a front vehicle module (i.e., tractor) configured to pull or otherwise propel a rear hauling module. Moreover, the front vehicle may be configured with an engine or other such power source and a steering mechanism to propel and maneuver the work machine around the work site. Additionally, the front vehicle module may be pivotally coupled with the rear vehicle module, which may provide smaller turning radii and other maneuvering capabilities which allow the work vehicle to steer and maneuver around the narrow work site pathways.

Typically, the work machine may be configured with one front vehicle module and one rear hauling module in order to haul material across a variety of terrain such as traveling through narrow and twisting pathways in a mine or quarry. However, the use of one rear hauling vehicle may limit the hauling capacity of the work machine, increase the number of work machines required to complete a specific task, and increase the amount of time it may take to complete the specific task. As a result, it may be desired to configure the work machine to include more than one rear hauling module attached or otherwise coupled behind the lead vehicle module. For example, two or more rear hauling modules may be coupled behind the lead vehicle module in an attempt to provide additional hauling capacity. However, adding additional rear hauling modules may increase the overall length of the work machine. The increased length may create a challenge for the operator to steer and maneuver the work machine with increased length around the narrow and twisting work site pathways.

A double pivot joint for road vehicles is disclosed in International Patent Application Publication No. WO 2014/0300082 entitled, "Double Joint Pivot Unit with Runner Gear for Road Vehicles," (the '082 publication). The double pivot joint disclosed therein is equipped with a joint unit including double pivots and configured to couple a front member and a rear member of a vehicle. The joint unit of the '082 publication further includes a first rotating ring located in a portion of the joint unit towards the front member and a second rotating ring located in a portion of the joint unit towards the rear member. Additionally, the joint unit includes hydraulic cylinders connected through a hinged joint to a rocker gear. During normal operation the hydraulic cylinders follow the movement the rocker gear and serve as shock absorbers. However, the hydraulic cylinders are configured to hinder the movement of the rocker gear in situations where sudden and large turns of the front and rear members of the vehicle are detected, and therefore the respective members of the vehicle cannot rotate relative to each other.

However, the '082 publication does not utilize steering angle, route information, and operating conditions of the work machine to control and adjust an angle between the front member and the rear member of the vehicle.

SUMMARY OF THE DISCLOSURE

In accordance with one embodiment, a control system for steering a work machine is disclosed. The control system may include a steering input device configured to steer a lead machine module of the work machine. Moreover, an articulation module may be disposed between the lead machine module and a trailing machine module and the articulation module maybe configured to pivotally couple the lead machine module and the trailing machine module about an articulation module pivot point. A first articulation cylinder may be included in the articulation module and operably coupled to the lead machine module and the trailing machine module, and the first articulation cylinder may be configured to actuate between a first cylinder first position and a first cylinder second position. Moreover, a second articulation cylinder may be included in the articulation module and operably coupled to the lead machine module and the trailing machine module, the second articulation cylinder may be configured to actuate a second cylinder first position and a second cylinder second position. The control system may further include an electronic controller in electronic communication with the first articulation cylinder and the second articulation cylinder of the articulation module, the electronic controller may be programmed to transmit a control signal to each of the first articulation cylinder and the second articulation cylinder. The control signal may be transmitted to cause the first articulation cylinder to actuate between the first cylinder first position and the first cylinder second position and to cause the second articulation cylinder to actuate between the second cylinder first position and the second cylinder second position such that the lead machine module and the trailing machine module each pivot about the articulation module pivot point.

In accordance with another embodiment, a method of steering and maneuvering a work machine is disclosed. The method may include coupling a lead machine module to a trailing machine module with an articulation module disposed between the lead machine module and the trailing machine module. The method may further include attaching a first articulation cylinder of the articulation module to the lead machine module and the trailing machine module and attaching a second articulation cylinder of the articulation module to the lead machine module and the trailing machine module. Additionally, the method may include programming a control signal with an electronic controller. The method may further include transmitting the control signal to actuate the first articulation cylinder and the second articulation cylinder between a first cylinder first position and a first cylinder second position and a second cylinder first position and a second cylinder second position.

In accordance with yet another embodiment, a work machine is disclosed. The work machine may include a lead machine module including a steering input device configured to steer the work machine and at least one trailing machine module positioned behind the lead machine module arranged in a train-like configuration. The work machine may further include an articulation module disposed between the lead machine module and the at least one trailing machine module, the articulation module configured to pivotally couple the lead machine module and the at least one trailing machine module such that the lead machine module and the at least one trailing machine module pivot about an articulation pivot point. A first articulation cylinder may be included in the articulation module and operably coupled to the lead machine module and the at least one trailing machine module, the first articulation cylinder may be configured to actuate between a first cylinder first position and a first cylinder second position. A second articulation cylinder may be included in the articulation module and operably coupled to the lead machine module and the at least one trailing machine module the second articulation cylinder may be configured to actuate between a second cylinder first position and a second cylinder second position. The work machine may further include an electronic controller in electronic communication with the first articulation cylinder and the second articulation cylinder. The electronic controller may be programmed to transmit a control signal to each of the first articulation cylinder and the second articulation cylinder such that the control signal being transmitted may cause the first articulation cylinder to actuate between the first cylinder first position and the first cylinder second position and to cause the second articulation cylinder to actuate between the second cylinder first position and the second cylinder second position such that the lead machine module and the at least one trailing machine module pivot with respect to one another about the articulation module pivot point.

These and other aspects and features of the present disclosure will be more readily understood upon reading the following detailed description in conjunction with the accompanying drawings.

DETAILED DESCRIPTION

Figure 1:
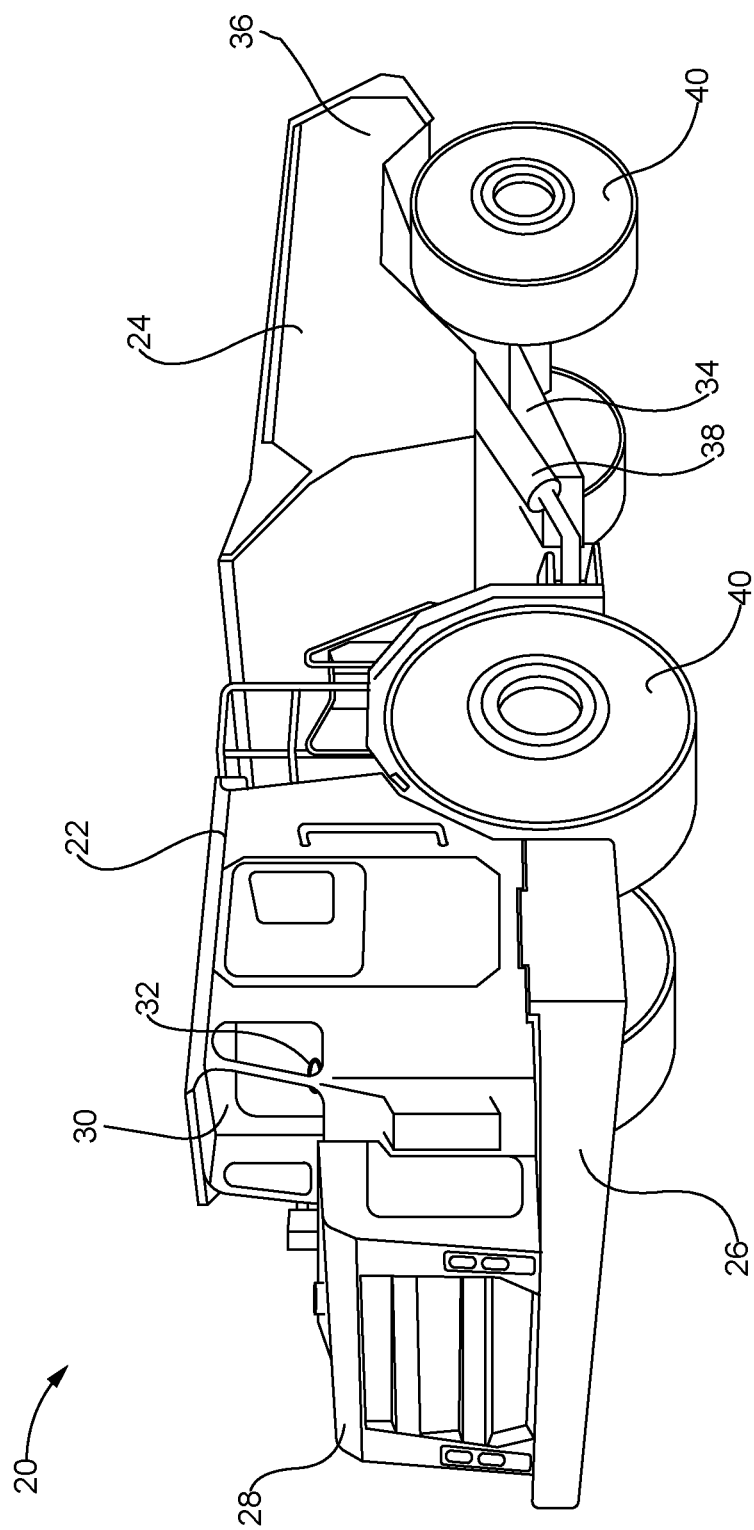
FIG. 1 is a perspective side view of a work machine, in accordance with an embodiment of the present disclosure.

Referring now to the drawings and with specific reference to FIG. 1, a work machine 20 is shown, in accordance with certain embodiments of the present disclosure. While one non-limiting example of the work machine 20 is illustrated as an articulated truck, it will be understood that the work machine 20 may include other types of machines such as but not limited to, an on-road truck, an off-road truck, a motor grader, industrial mining equipment, a locomotive, and any other such machine. The work machine 20 may include a lead machine module 22 (e.g., a tractor) which is coupled to a trailing machine module 24 (e.g., a load bin). While FIG. 1 illustrates one trailing machine module 24 coupled with the lead machine module 22, it will be understood that more than one trailing machine module 24 may be positioned behind the lead machine module 22 in a train like configuration (i.e., where a locomotive is configured to pull one or more rail cars behind it). Furthermore, the lead machine module 22 may include a frame 26 configured to support a power source 28, and an operator compartment or operator cabin 30. In some embodiments, the power source 28 may be a power generating source such as but not limited to, a diesel combustion engine, a gasoline combustion engine, a generator, and electric motor, or other known power generating source. Moreover, the operator compartment 30 may be configured with a set of operational controls such as but not limited to, a steering input device 32, throttle controls (not shown), machine implement controls (not shown), and other such operational controls. Additionally, the trailing machine module 24 may include a frame 34 configured to support a dump bed 36 or other such hauling container. In some embodiments, the dump bed 36 is pivotally attached to the frame 34 and configured to be filled with a work material such as dirt, stone, gravel, and the like. Moreover, the dump bed 36 may be coupled to the frame 34 by one or more dump actuators 38 such that the dump bed 36 may be raised and/or lowered in order to dump the material being hauled by the trailing machine module 24.

The work machine 20 may further include a set of ground engaging members 40 rotatably coupled to the frame 26 and the frame 34 of the lead machine module 22 and the trailing machine module 24 respectively. The ground engaging members 40 may be driven by the power source 28 to propel the work machine 20 in a direction of movement. Moreover, the ground engaging members 40 of the lead machine module 22 may be operably coupled to the steering input device 32 (e.g., steering wheel or one or more joysticks), and configured to steer and maneuver the work machine 20 while in use. For example, an input provided to the steering input device 32 may be transferred to the ground engaging members 40 of the lead machine module 22 which adjusts the position of the ground engaging members 40, causing the work machine 20 to turn. In some embodiments, the steering input device 32 may also be coupled to the ground engaging members 40 coupled to the frame 34 of the trailing machine module 24 and an input provided to the steering input device 32 may additionally adjust the position (i.e., steer) of the ground engaging members 40 of the trailing machine module 24. Although the set of ground engaging members 40 are shown as wheels, other types of engagement devices, such as continuous tracks and the like, may be used. It is to be understood that the work machine 20 is shown primarily for illustrative purposes to assist in disclosing features of various embodiments of the present disclosure, and that FIG. 1 may not depict all of the components of the work machine 20.

Figure 2:
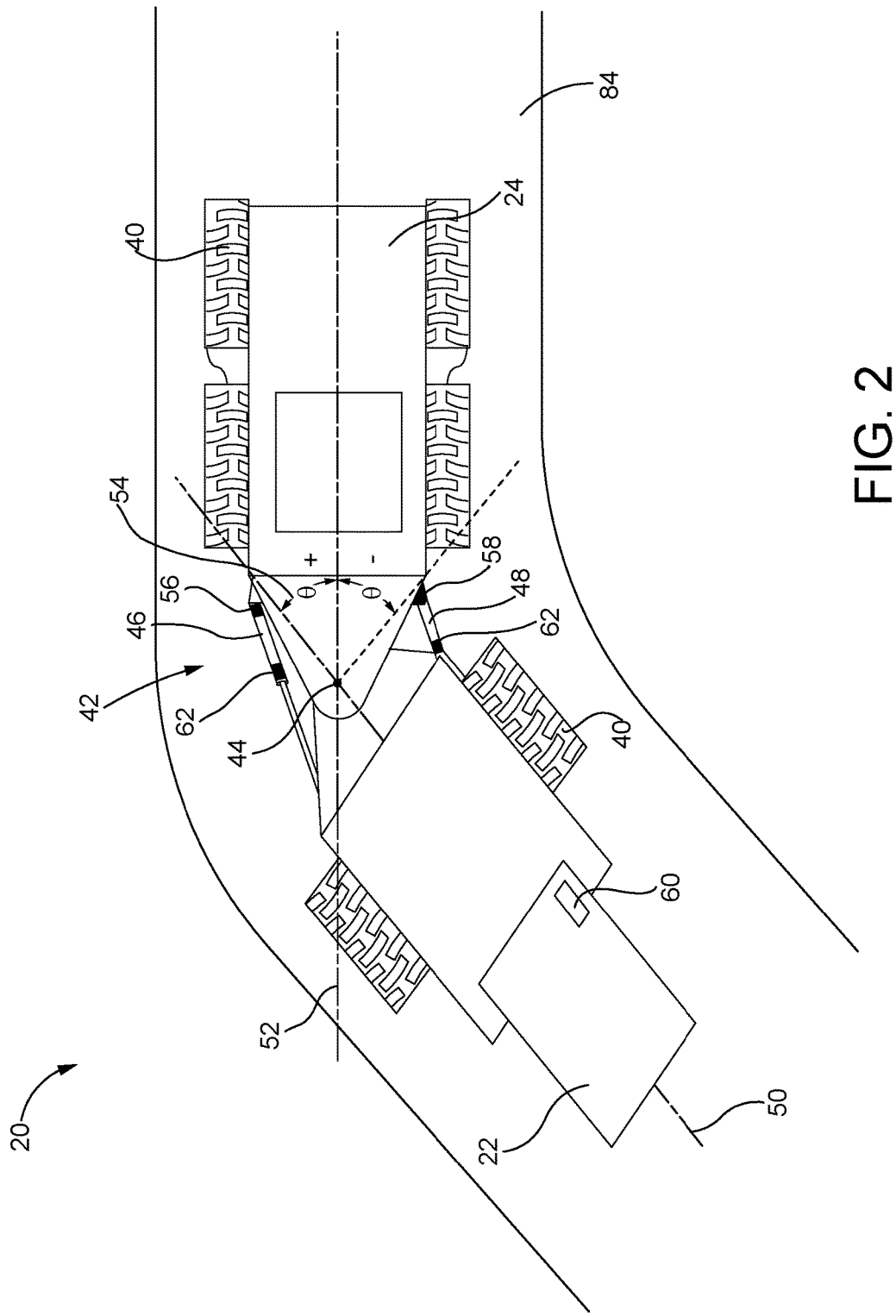
FIG. 2 is a top view of the work machine of FIG. 1, in accordance an embodiment of the present disclosure.

Referring now to FIG. 2, with continued reference to FIG. 1, a top view of the work machine 20 is shown. In one non-limiting example, the work machine 20 is arranged in a train-like configuration with one lead machine module 22 and one trailing machine module 24 positioned directly behind the lead machine module 22. However, it will be understood that other arrangements and configurations of the work machine 20 are possible which add more than one trailing machine module 24 behind the lead machine module 22. Moreover, the lead machine module 22 and trailing machine module 24 may be pivotally coupled together with an articulation connection module 42 (i.e., articulation joint). As shown in FIG. 2, the articulation connection module 42 may be positioned between the lead machine module 22 and the trailing machine module 24, and the articulation connection module 42 may be configured to pivotally adjust the position of the lead machine module 22 relative to the trailing machine module 24. Furthermore, additional trailing machine modules 24 may be added behind the lead machine module 22 and trailing machine module 24 using additional articulation connection modules 42 to pivotally couple adjacent trailing machine modules 24 together.

In some embodiments, the articulation connection module 42 is configured to pivot or otherwise rotate about a pivot point 44 of the articulation connection module 42 in order to assist the work machine 20 maneuver and steer around objects in its path. In one non-limiting example, the articulation connection module 42 may include a first articulation cylinder 46 coupled to the lead machine module 22 and the trailing machine module 24 and positioned along a first side of the articulation connection module 42. The articulation connection module 42 may further include a second articulation cylinder 48 coupled to the lead machine module 22 and the trailing machine module 24 and positioned along a second side of the articulation connection module 42. While first and second articulation cylinders 46, 48 are shown, an alternative number of cylinders (i.e., fewer or greater) may be possible.

The articulation connection module 42 may be configured such that the pivot point 44 of the articulation connection module 42 is located at an intersection point between a lead module longitudinal axis 50 and a trailing module longitudinal axis 52. Additionally, an articulation angle 54 of the articulation connection module 42 may be formed where the lead module longitudinal axis 50 intersects with the trailing module longitudinal axis 52. In one non-limiting example, the first and second articulation cylinders 46, 48 are positioned such that the pivot point 44 is located between the first and second articulation cylinders 46, 48 and actuation (i.e., extension and retraction) of the first and second articulation cylinders 46, 48 may cause the trailing machine module 24 to pivot or otherwise rotate about the pivot point 44. As a result, the position of the trailing machine module 24 relative to the lead machine module 22 may be precisely controlled by actuation of the first and second articulation cylinders 46, 48.

Actuation of the first and second articulation cylinders 46, 48 may be controlled by a hydraulic control circuit (not shown) configured to deliver pressurized hydraulic fluid to each of the first and second articulation cylinders 46, 48. The hydraulic control circuit may include a pump (not shown) to pressurize and pump the fluid through and a series of hydraulic fluid lines (not shown) to deliver the fluid to the first and second articulation cylinders 46, 48 and other known hydraulic components of the work machine 20. For example, the first articulation cylinder 46 may be fluidly coupled with a first hydraulic control valve 56 and the second articulation cylinder 48 may be fluidly coupled with a second hydraulic control valve 58, and the first and second hydraulic control valves 56, 58 may be configured to selectively control delivery of the hydraulic fluid to extend and/or retract the first and second articulation cylinders 46, 48.

Furthermore, the work machine 20 may include at least one electronic controller 60 which is programmed to control the hydraulic control circuit, the first and second articulation cylinders 46, 48, the first and second hydraulic control valves 56, 58 and/or other components and systems of the work machine 20. In one non-limiting example, the electronic controller 60 may be located inside the operator compartment 30 of the lead machine module 22 and electronically and communicably coupled to various systems and components of the work machine 20. In one non-limiting example, the first and second hydraulic control valves 56, 58 may be electronically controlled solenoid valves or other known controllable valves, which are coupled to and controlled by the electronic controller 60. Moreover, the electronic controller 60 may be programmed to transmit one or more control signals to the first and second hydraulic control valves 56, 58 and the one or more control signals may instruct the first and second articulation cylinders 46, 48 to expand and/or retract. In some embodiments, the electronic controller 60 may be further configured to execute a program or other such set of control instructions, which precisely control the first and second hydraulic control valves 56, 58 and the first and second articulation cylinders 46, 48 to produce a pre-determined or desired articulation angle 54 of the articulation connection module 42.

In some embodiments, each of the first and second articulation cylinders 46, 48 may further include at least one articulation cylinder position sensor 62 configured to monitor the position (i.e., extension and retraction) of the first and second articulation cylinders 46, 48. Furthermore, the articulation cylinder position sensors 62 may be electronically and communicably coupled to the electronic controller 60 and configured to transmit the position data of the first and second articulation cylinders 46, 48 to the electronic controller 60. As a result, the electronic controller 60 may use the received data from the articulation cylinder position sensors 62 to determine the precise extended and/or retracted position of the first and second articulation cylinders 46, 48. The electronic controller 60 may be programmed to use this precise extended and/or retracted position data received from the articulation cylinder position sensors 62 to derive the current or actual articulation angle 54 of the articulation connection module 42. Furthermore, it will be understood that in embodiments of the work machine 20 where a plurality of articulation connection modules 42 are used to couple a plurality of trailing machine modules 24 together, the electronic controller 60 may be configured to receive the position data from the articulation cylinder position sensors 62 coupled to the first and second articulation cylinders 46, 48 of each articulation connection module 42, and derive individual determined articulation angles 54 for each of the articulation connection modules 42.

Figure 3:
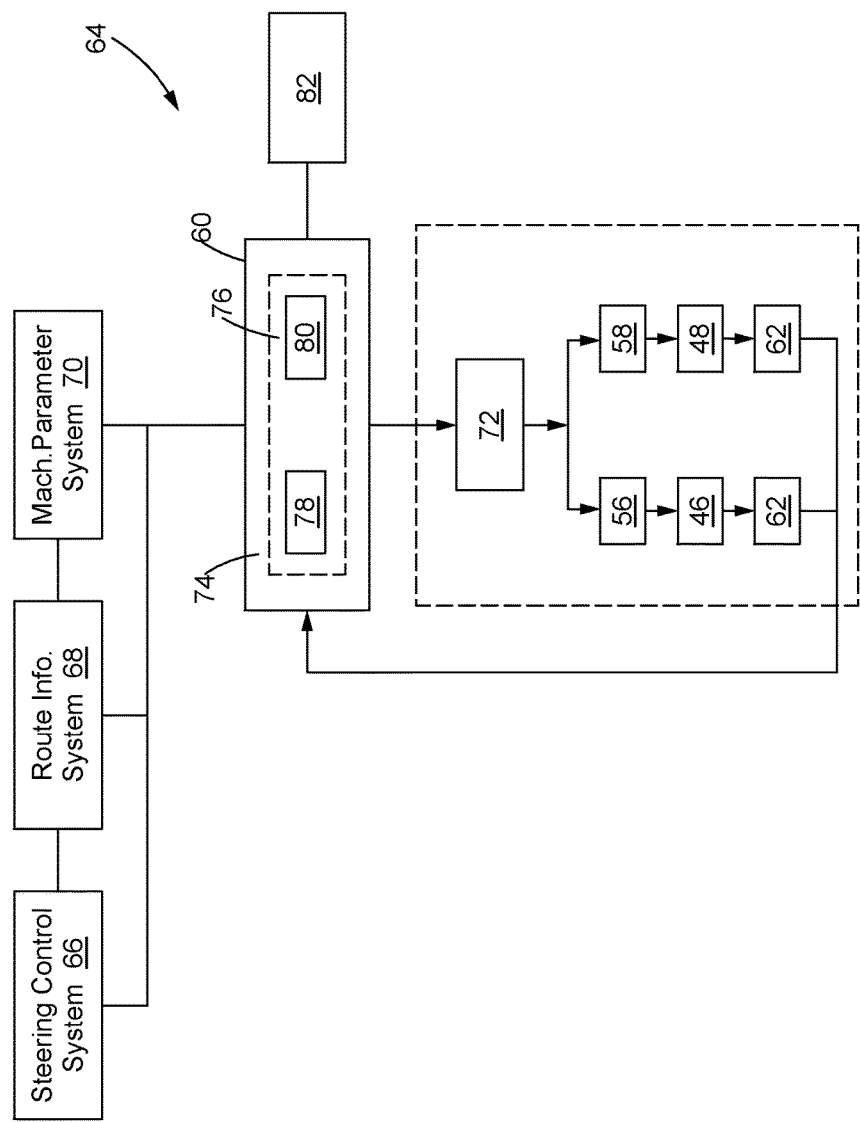
FIG. 3 is schematic diagram of a control system for controlling the work machine of FIG. 1, in accordance with an embodiment of the disclosure.

Referring to FIG. 3 with continued reference to FIGS. 1-2, the work machine 20 may include an electronic control system 64 configured to monitor and control one or more articulation connection modules 42, the first and second articulation cylinders 46, 48, and other systems and components of the work machine 20. The electronic control system 64 may include the electronic controller 60 which is programmed to send and receive data signals and other information between a variety of input devices such as but not limited to, the articulation cylinder position sensors 62, a machine steering system 66, a route and location information system 68, a machine operational parameter monitoring system 70, and other such systems and input devices of the work machine 20. Additionally, the electronic controller 60 may include software or other executable data file configured to analyze and process the data signals and other information received from the articulation cylinder position sensors 62, the machine steering control system 66, the route and location information system 68, the machine operational parameter monitoring system 70, and other such systems and input devices. Furthermore, based on the analysis of the received data signals and other collected input information, the electronic controller 60 may output or otherwise transmit a plurality of command and control signals to the first and second hydraulic control valves 56, 58, the first and second articulation cylinders 46, 48, and other systems and components of the work machine 20.

As illustrated in FIG. 3, the electronic control system 64 may include a separate valve controller 72 that is communicably coupled with the electronic controller 60 and the first and second hydraulic control valves 56, 58. The valve controller 72 may receive command and control signals, or other such instructions from the electronic controller 60. The valve controller 72 may be further configured to transmit the command and control signals to the first and second hydraulic control valves 56, 58 which are configured to control actuation of the first and second articulation cylinders 46, 48. In an alternative embodiment, the valve controller 72 may be incorporated within the electronic controller 60 such that the electronic controller 60 is directly coupled with the first and second hydraulic control valves 56, 58 and transmits the command and control signals to control the first and second hydraulic control valves 56, 58 and the actuation of the first and second articulation cylinders 46, 48.

The electronic controller 60 may include a microprocessor 74 for executing the software, programs, and/or algorithms that are configured to control, monitor, and measure the various functions of the work machine 20. Moreover, the microprocessor 74 may include a memory module 76 which further includes read only memory (ROM) 78, configured to provide storage for the software, programs, algorithms, and data. Additionally, the memory module 76 may include random access memory (RAM) 80, which provides storage space for the data generated during the execution of the software, programs, and/or algorithms. While the microprocessor 74 is illustrated in FIG. 3, it will be appreciated that other components such as but not limited to, a microcontroller, an application specific integrated circuit (ASIC), or other electronic device may be used to control and operate the work machine 20.

The electronic controller 60 may be housed within the operator compartment 30 (FIG. 1) of the work machine 20. Additionally or alternatively, the electronic controller 60 may be configured as a main controller communicably coupled with one or more additional controllers located in multiple locations of the work machine 20 such that data and other information may be transmitted and received between the electronic controller 60 and each additional controller. In one non-limiting example, the work machine 20 includes at least two controllers, the electronic controller 60 and the valve controller 72, configured to control and monitor the work machine 20. However, as discussed above other controller configurations of the work machine 20 are possible.

Furthermore, the electronic controller 60 may be operably coupled to an input/output device 82, and an operator of the work machine 20 may use the input/output device 82 to access and selectively operate the electronic controller 60. For example, the input/output device 82 may be configured to allow the operator to input or execute commands to the electronic controller 60 through a keyboard, a mouse, a dial, a button, a joystick, a touch screen, a microphone, or other known input device. Additionally, data and other such information provided by the electronic controller 60 may be output to a display device such as but not limited to, a monitor, a speaker, a video screen, or other visual/audio display device capable of providing the output of the electronic controller 60 to the operator. In some embodiments, the input/output device 82 may be coupled to the electronic controller 60 through a wired connection and the input/output device 82 may be adjacently positioned to the electronic controller 60 in the operator compartment 30 of the work machine 20. Alternatively, the input/output device 82 may be coupled to the electronic controller 60 through a wireless communication network such as, a Bluetooth network, a near-field communication network, a radio frequency communication network, a computer data network, a Wi-Fi data network, a cellular data network, a satellite data network, or other such data communication network. Furthermore, the input/output device 82 may be configured as a handheld mobile device wirelessly connected to the electronic controller 60 such as but not limited to, a tablet computer, a smart phone, a cellular phone, a laptop computer, or other such mobile electronic device. As a result, the operator and the input/output device 82 may be remotely located from the electronic controller 60. In some embodiments, the input/output device 82 may be configured such that operator remotely communicates with the electronic controller 60 to control and monitor the work machine 20 from a location other than the operator compartment 30. Moreover, a supervisor, planner, mechanic, or other interested personnel may be able to access the electronic controller 60 from a separate input/output device 82 which remotely communicates with the electronic controller 60 to monitor and view the activity of the work machine 20.

During operation, the electronic control system 64 may be configured to control and monitor the articulation connection module 42 and other systems and components of the work machine 20. In some embodiments, the work machine 20 may be configured with the lead machine module 22 operatively coupled to the trailing machine module 24 with the articulation connection module 42. Moreover, the articulation connection module 42 may be configured to assist the maneuvering of the work machine 20 as it travels along a route or pathway 84 (FIG. 2). In some embodiments, one or more additional trailing machine modules 24 may be added to the work machine 20 and each additional trailing machine module 24 is coupled to the adjacent trailing machine module 24 with an additional articulation connection module 42. As a result, the electronic control system 64 may be configured to control each of the articulation connection modules 42 thereby controlling and monitoring the steering and maneuvering of the lead machine module 22 and each trailing machine module 24 included in the work machine 20.

In some embodiments, the articulation connection module 42 includes the first and second hydraulic control valves 56, 58 which are fluidly coupled to the first and second articulation cylinders 46, 48 respectively. Furthermore, the electronic controller 60 may transmit at least one control signal to the valve controller 72, and the valve controller 72 transmits the control signal to each of the first and second hydraulic control valves 56, 58. Alternatively, the electronic controller 60 may be configured to include the valve controller 72 and directly transmit the control signal to the first and second hydraulic control valves 56, 58. As a result, the first and second hydraulic control valves 56, 58 may be controlled or otherwise instructed to direct the flow of hydraulic fluid to the first and second articulation cylinders 46, 48 such that the selective control of hydraulic fluid causes the first and second articulation cylinders 46, 48 to extend and/or retract.

Generally, the first and second articulation cylinders 46, 48 are configured such that when one of the first and second articulation cylinders 46, 48 extends the other one of the first and second articulation cylinders 46, 48 retracts. As a result, the opposing articulation of the first and second articulation cylinders 46, 48 may adjust the position of the adjacent lead machine module 22 and trailing machine module 24 with respect to one another. Furthermore, the electronic controller 60 may be programmed to extend and/or retract the first and second articulation cylinders 46, 48 a pre-determined amount such that the desired articulation angle 54 (FIG. 2) is formed between the adjacently positioned lead machine module 22 and trailing machine module 24. As discussed above, the articulation angle 54 may be defined as the angle formed at the intersection of the lead module longitudinal axis 50 (FIG. 2) and the trailing module longitudinal axis 52 (FIG. 2), and the intersection may further define the pivot point 44 (FIG. 2) of the articulation connection module 42.

Additionally, each of the first and second articulation cylinders 46, 48 may be coupled to an articulation cylinder position sensor 62 configured to monitor the extended and/or retracted position of the first and second articulation cylinders 46, 48. Each articulation cylinder position sensor 62 may additionally be configured to transmit the collected position data to the electronic controller 60. In some embodiments, the electronic controller 60 may use the received position data from each of the articulation cylinder position sensor 62 to determine or otherwise derive the actual articulation angle 54 of the articulation connection module 42. As a result, the electronic controller 60 may be configured to compare the actual articulation angle 54, derived from the analysis of the first and second articulation cylinders 46, 48 position data, with the desired articulation angle 54 programmed or otherwise input into the electronic controller 60. In some embodiments, the electronic controller 60 may calculate a difference between the actual articulation angle 54 and the desired articulation angle 54. Furthermore, the electronic controller 60 may derive or otherwise generate a control signal based on a predetermined set of control scheme parameters such as but not limited to, a proportional gain, an integral gain, and a derivative gain. The electronic controller 60 may send the derived control signal to the valve controller 72 to control the first and second hydraulic control valves 56, 58 and adjust the first and second articulation cylinders 46, 48 to correct the difference between the actual and desired articulation angles 54. Alternatively, no adjustment control signal may be transmitted by the electronic controller 60 when the actual articulation angle 54 is equal to the desired articulation angle 54.

In some embodiments, the electronic controller 60 may be coupled to one or more additional systems and components which supply data and other such information used in controlling the work machine 20. The electronic controller 60 may use this additional data to control and monitor the articulation connection module 42. For example, the electronic controller 60 may be electronically and communicably coupled to a machine steering control system 66 of the work machine 20, and the steering control system 66 may be able to monitor the angle or position of the steering input device 32 (FIG. 1) and/or the front ground engaging elements 40 of the lead machine module 22. The electronic controller 60 may be programmed to receive and utilize the angle or position of the steering input device 32 and front ground engaging elements 40 as an additional or alternative method to derive the desired articulation angle 54 of the articulation connection module 42 formed between the adjacently positioned lead machine module 22 and trailing machine module 24. The front ground engaging elements 40 of the lead machine module 22 typically move in response to a corresponding movement of the steering input device 32 performed while steering or otherwise maneuvering the work machine 20. As a result, the angle or position of the steering input device 32 and/or the front ground engaging elements 40 may be used to derive or otherwise calculate the relative articulation angle 54 of the articulation connection module 42.

Moreover, the machine steering control system 66 may be configured to operate in two or more operational modes. In a first mode, the steering control system 66 may be selected to operate in a fully automatic mode such that the steering control system 66, the electronic control system 64 and other systems and components automatically control the operation of the work machine 20. In the fully automatic mode, the steering control system 66 may receive a control signal from the electronic controller 60 to automatically control the direction of the front ground engaging elements 40 of the lead machine module 22 during a steering and maneuvering event of the work machine 20. Additionally, the electronic controller 60 and the valve controller 72 may automatically control the actuation of the first and second articulation cylinders 46, 48 to achieve the desired articulation angle 54 which is derived according to the input received from the steering control system 66, the route information received from the route and location information system 68, and the machine operating parameters (i.e., machine speed, gross load, and net load) received from the machine parameter monitoring system 70. As a result, when the work machine 20 operates in the fully automatic mode the steering and maneuvering of the work machine 20 and the control of the relative position of the lead machine module 22 and trailing machine module 24 may be fully autonomous with no input needed from the operator.

Alternatively, in a second mode, the steering control system 66 may be selected to operate in a semi-automatic mode such that manual input to the machine steering control system 66 may be provided by the operator of the work machine 20 and the electronic control system 64 may automatically control the relative position of the articulation connection module 42. In the semi-automatic mode, the steering input device 32 may be manually controlled by the operator to change the direction of the front ground engaging elements 40 of the lead machine module 22 during a steering or maneuvering event. However, the electronic controller 60 and the valve controller 72 may automatically control the actuation of the first and second articulation cylinders 46, 48 and other components of the articulation connection module 42 to achieve the desired articulation angle 54 which is derived according to the input received from the steering control system 66, the route information received from the route and location information system 68, and the machine operating parameters (i.e., machine speed, gross load, and net load) received from the machine parameter monitoring system 70. As a result, in the semi-automatic mode the work machine 20 operator may control the steering and maneuvering of the work machine 20 while the electronic control system 64 automatically controls the relative position of the articulation connection module 42 to maneuver the lead and trailing machine modules 22, 24.

In some embodiments, the work machine 20 may additionally be configured with a route and location information system 68 that provides defined route information to the work machine 20 through a communication module (not shown). For example, the electronic control system 64 may be communicably coupled with the route and location information system 68 and configured to receive data and other information related to a proposed route for the work machine 20 to follow around a work site. One such communication module may be configured according to the system disclosed in the commonly-assigned U.S. Patent Application Publication No. 2016/0057004 A1, entitled, "Systems and Methods for Machine-to-Machine Ad-Hoc Communication," which is incorporated herein by reference. In one non-limiting example, the route and location information system 68 is electronically and communicably coupled to the electronic controller 60. Moreover, the route and location information system 68 may be used by the electronic controller 60 to analyze and prepare a navigation plan around the work site. For example, the route information may be used to determine certain conditions of route or pathway 84 (FIG. 2) such as but not limited to, turns, ascents, descents, width, and other such route conditions encountered by the work machine 20.

The electronic controller 60 and the route and location information system 68 may determine a steering and maneuvering plan based on the route and pathway 84 conditions and create a series of control signals for the electronic controller 60 to transmit to the first and second hydraulic control valves 56, or other component of the articulation connection module 42. In some embodiments, the electronic controller 60 may use the input received from the steering control system 66, the route information received by the route and location information system 68, and the machine operating parameters (i.e., machine speed, gross load, and net load) received from the machine parameter monitoring system 70 to determine a set of desired articulation angles 54 such that the first and second articulation cylinders 46, 48 of the articulation connection module 42 are adjusted to maneuver the lead machine module 22 and the trailing machine module 24 along the route or pathway 84. Furthermore, in the fully automatic mode the electronic controller 60 may determine a set of steering control signals based on the route information and transmit the steering control signals to the steering control system 66.

For example, the electronic controller 60 may transmit at least one control signal to the first and second hydraulic control valves 56, 58, or other component of the articulation connection module 42, to actuate the first and second articulation cylinders 46, 48 and form a first desired articulation angle 54 such that the work machine 20 steers or maneuvers around a turn or other such feature of the route or pathway 84. Additionally, the electronic controller 60 may transmit at least one control signal to the steering control system 66 to control the steering input device 32 such that the front ground engaging elements 40 of the lead machine module 22. As the work machine 20 continues to travel around the work site, additional control signals may be transmitted by the electronic controller 60 of the first and second hydraulic control valves 56, 58 to actuate the first and second articulation cylinders 46, 48 to form additional desired articulation angles 54. In some embodiments, the electronic controller 60 and the route and location information system 68 may be used to create as many control signals to instruct the formation of as many additional desired articulation angles 54 as needed for the work machine 20 to successfully travel and maneuver around the route or pathway 84. For example, the route and location information system 68 may provide information of the route or pathway 84 that the work machine 20 intends to follow. The electronic controller 60 may be programmed to analyze the turns, ascents, descents, width, and other such route conditions of the intended route or pathway 84, and generate a set of desired articulation angles 54 based on the analysis of the route or pathway 84. As the work machine 20 starts moving along the route or pathway 84, the electronic controller 60 may transmit the pre-determined desired articulation angles 54 to the articulation connection module 42 to adjust and maneuver the work machine 20 as it travels around the route or pathway 84.

The work machine 20 may further include a machine parameter monitoring system 70 which is configured to monitor one or more work machine 20 operational conditions such as but not limited to, machine speed, net machine load, relative position of adjacent lead machine modules 22 and trailing machine modules 24, and other known machine parameters. Moreover, the machine parameter monitoring system 70 may be electronically and communicably coupled with the electronic control system 64. The machine parameter monitoring system 70 may be configured to transmit machine parameter data to the electronic controller 60 and receive control signals from the electronic controller 60 and other components of the electronic control system 64. In one non-limiting example, the electronic controller 60 may utilize machine operational conditions (i.e., current speed, gross load, net load, relative position) when determining the desired articulation angle 54 for the articulation connection module 42. Furthermore, the machine operational conditions may influence the steering and maneuvering of the work machine 20 and the desired articulation angle 54 may need to be adjusted accordingly. For example, the higher the machine speed monitored by the machine parameter monitoring system 70, a smaller desired articulation angle 54 may be derived in order to prevent jack-knifing, or other such undesired maneuvering event of the work machine 20. Additionally, the gross load, and/or net load may affect the maneuverability of the work machine 20, and a larger or smaller desired articulation angle 54 may be needed based on the detected gross load and net load by the machine parameter monitoring system 70. It will be appreciated that other conditions may also be monitored by the machine parameter monitoring system 70 and used by the electronic controller 60 for determining the desired articulation angle 54 for the articulation connection module 42.

Additionally, the memory module 76 of the electronic controller 60 may be configured to save data received from the articulation cylinder position sensors 62, the steering control system 66, the route and location information system 68, the machine parameter monitoring system 70 and other systems and components to create a historical operational data set of the work machine 20. Moreover, the electronic controller 60 may save or log the machine operating conditions and cylinder position data from events where there was a mismatch between the desired and actual articulation angles 54. Additionally, the electronic controller 60 may save and log the corrective action control signals transmitted to the valve controller 72, the first and second hydraulic control valves 56, 58, the first and second articulation cylinders 46, 48 and other systems and components of the work machine 20. In some embodiments, the electronic control system 64 may be further configured to analyze the historical data set saved on the electronic controller 60 to identify any operational trends or other signals which may allow the electronic control system 64 to predict when abnormal maneuvering and steering conditions may occur. Furthermore, the electronic control system 64 may be able to adaptively adjust or optimize the predetermined control scheme parameters (i.e., a proportional gain, an integral gain, and a derivative gain) based on the analysis of the historical data set to improve the future maneuvering performance of the work machine 20.

Figure 4:
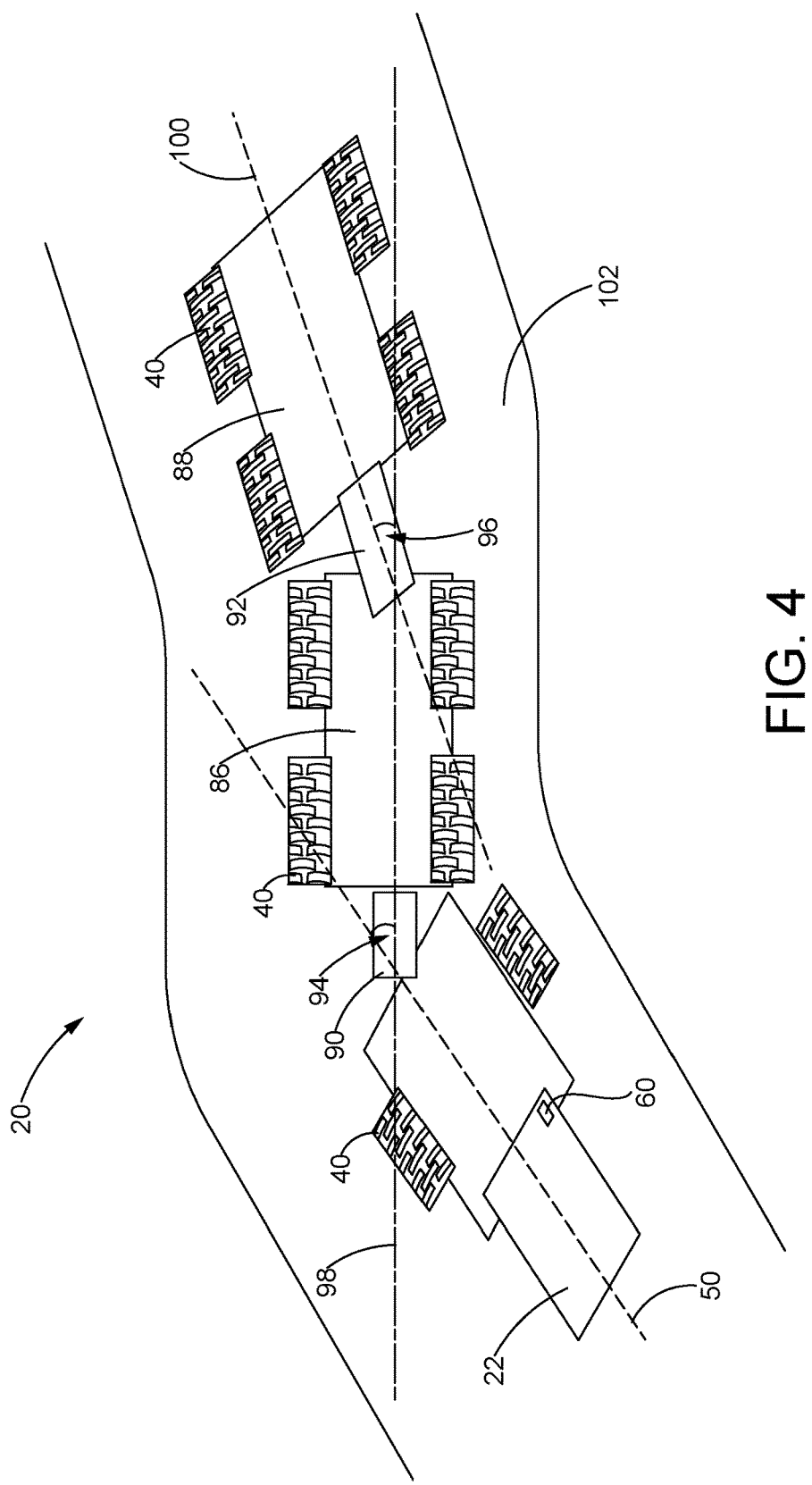
FIG. 4 is a top view of the work machine of FIG. 1 including two trailing machine modules, in accordance with an embodiment of the present disclosure.

Referring to FIG. 4, with continued reference to FIGS. 2-3, a non-limiting example of the work machine 20 is illustrated. As shown, the work machine 20 may be configured to include the lead machine module 22 configured to pull a first trailing machine module 86 and a second trailing machine module 88. While FIG. 4 shows the lead machine module 22 pulling two trailing machine modules 86, 88, it will be understood that additional machine modules may be added. In some embodiments, the lead machine module 22 may be pivotally coupled to the first trailing machine module 86 using a first articulation connection module 90, and the first trailing machine module 86 may additionally be pivotally coupled to the second trailing machine module 88 using a second articulation connection module 92. Each of the first and second articulation connection modules 90, 92 may include the first and second articulation cylinders 46, 48 (as shown in FIG. 2) such that the relative position of lead machine module 22 and the first trailing machine module 86 may be independently controlled from the relative position of the first trailing machine module 86 and the second trailing machine module 88.

Furthermore, each of the first and second articulation connection modules 90, 92 may be independently actuated to form a first articulation angle 94 and a second articulation angle 96. The first articulation angle 94 may be formed by the intersection of the lead module longitudinal axis 50 and the first trailing module longitudinal axis 98, and the second articulation angle 96 may be formed by the intersection of the first trailing module longitudinal axis 98 and the second trailing longitudinal axis 100. As a result, the relative positions of the lead machine module 22, the first trailing machine module 86, and the second trailing machine module 88 may be precisely controlled during the operation of the work machine 20.

In some embodiments, the work machine 20 may encounter a complicated route or pathway 102 while traveling around the work site. For example, as shown in FIG. 4, the complicated route or pathway 102 may include a plurality of directional changes (i.e., multiple turns) such that steering and maneuvering the work machine 20 may become increasingly difficult. Furthermore, adding the first and second trailing machine modules 86, 88 may create a configuration of the work machine 20 that is difficult for the operator to manually steer and maneuver around the complicated route or pathway 102. However, the electronic control system 64, the route and location information system 68, and the steering control system 66 (FIG. 3), along with the first and second articulation modules 90, 92 may enable the work machine 20 to steer and maneuver along the complicated route or pathway 102.

For example, the route and location information system 68 may provide information of the complicated route or pathway 102 that the work machine 20 intends to follow. The electronic controller 60 may be programmed to analyze the turns, ascents, descents, width, and other such route conditions of the intended complicated route or pathway 102, and generate a set of desired articulation angles 54 based on the analysis of the complicated route or pathway 102. Additionally, the electronic controller 60 may use the analysis of the complicated route or pathway 102 to generate a set of control signals for the steering control system 66. In one non-limiting example, the operator of the work machine 20 may operably select the electronic control system 64 to operate in a fully automatic mode to help the work machine 20 travel along the complicated route or pathway 102. In the fully automatic mode, the electronic controller 60 may transmit the set of desired articulation angles 54 to automatically control the first and second articulation modules 90, 92. Additionally, the electronic controller 60 may transmit the set of control signals to the steering control system 66 to automatically control the steering input device 32 (FIG. 1) to automatically adjust the front ground engaging elements 40 of the lead machine module 22. As a result, the work machine 20 may automatically travel and maneuver around the various turns, ascents, descents, and other such obstacles as it continues along the complicated route or pathway 102. It will be understood that the work machine 20 may be operated in the fully automatic mode to travel along the route or pathway 84, or any other pathway traveled by the work machine 20.

INDUSTRIAL APPLICABILITY

In general, the present disclosure may find application in many industries, including but not limited to, mining, construction, agriculture, and other such industries. In some embodiments, the work machine 20 may include a lead machine module 22 and at least one trailing machine module 22. The work machine 20 may be configured to travel around a route or pathway 84, 102. Furthermore, during operation of the work machine 20, the electronic control system 64 may be configured to monitor and control the steering and maneuvering of the work machine 20. More specifically, the electronic control system 64 may control the positioning and relative angle formed between the lead machine module 22 and one or more trailing machine modules 24. Furthermore, the electronic control system 64 may be electronically and communicably coupled with one or more machine systems such as but not limited to, the steering control system 66, the route and location information system 68, the machine parameter monitoring system 70, and other such machine systems.

Figure 5:
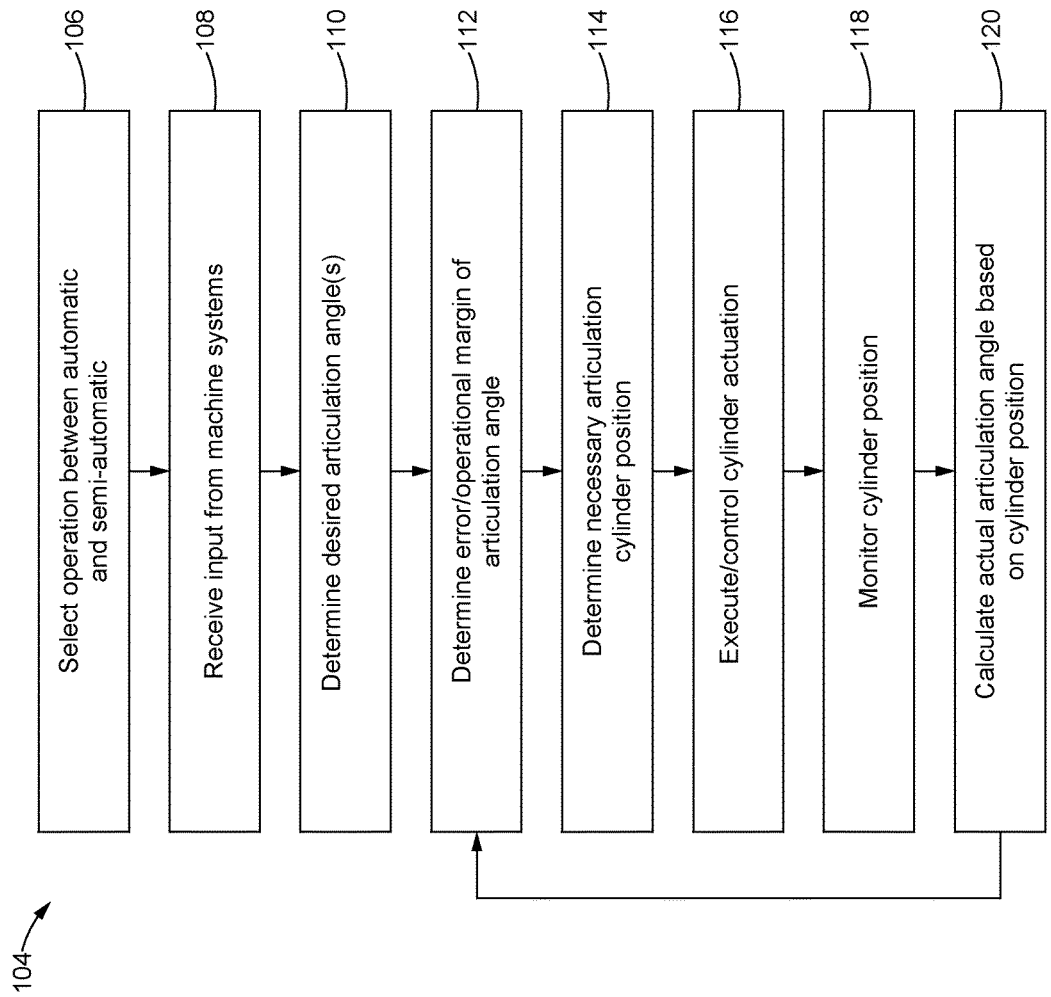
FIG. 5 is a flow chart of a method executed by the control system of FIG. 3 for steering and maneuvering the work machine of FIG. 1, in accordance with an embodiment of the present disclosure.

Referring to FIG. 5, with continued reference to FIGS. 1-4, a method 104 for steering and maneuvering a work machine 20 is shown. In a first block 106 of the method 104, the work machine 20 may be selected to operate in a fully automatic mode or a semi-automatic mode. In some embodiments, the operator may input or otherwise select the operational mode on the electronic controller 60 or other such control component of the work machine 20. In the fully automatic mode, the steering control system 66 may be configured to automatically control the direction of the front ground engaging elements 40 of the lead machine module 22 and each articulation connection module 42 may be automatically controlled by the electronic control system 64. Alternatively, in the semi-automatic mode the operator may manually control the direction of the front ground engaging elements 40 of the lead machine module 22 by controlling the steering input device 32, and each articulation connection module 42 may be automatically controlled by the electronic control system 64.

Once the operational mode of the work machine 20 is selected, in a next block 108, the electronic control system 64 may receive at least one operational input of the work machine 20. For example, the electronic controller 60 of the electronic control system 64 may be communicably coupled to the steering control system 66. In some embodiments, the steering control system 66 may be configured to monitor the angle or other such position of the front ground engaging elements 40 of the lead machine module 22. Additionally or alternatively, the steering control system 66 may be configured to monitor the angle or position of the steering input device 32 located in the operator compartment 30 of the work machine 20. As a result, the steering control system 66 may transmit or otherwise communicate the angle and position of the front ground engaging elements 40 and/or the steering input device 32 to the electronic controller 60.

Furthermore, the electronic control system 64 may be communicably coupled to the route and location information system 68 which may be configured to provide detailed information regarding the planned route of travel for the work machine 20. Moreover, the route and location information system 68 may additionally be configured to provide real-time data of the movement of the work machine 20 along the work site route or pathway 84, 102. The electronic control system 64 may be additionally communicably coupled to the machine parameter monitoring system 70 which may be configured to transmit or otherwise communicate machine operating parameters such as but not limited to, speed, gross load, net load, relative position of adjacent lead machine modules 22 and trailing machine modules 24, and other such operational parameters of the work machine 20.

In a next block 110, the electronic control system 64 may determine or otherwise calculate the desired articulation angle 54 of each articulation connection module 42. In some embodiments, the electronic controller 60 may utilize the one or more operational inputs received from the steering control system 66, the route and location information system 68, the machine parameter monitoring system 70, and other such systems of the work machine 20 to determine or otherwise calculate the desired articulation angle 54. For example, the angle or position of the steering input device 32 and/or the front ground engaging elements 40 may be used by the electronic controller 60 to derive or otherwise calculate the relative desired articulation angle 54 of the articulation connection module 42. The route and location information system 68 may provide information of the route or pathway 84 and/or the complicated route or pathway 102 that the work machine 20 intends to follow. The electronic controller 60 may be programmed to analyze the turns, ascents, descents, width, and other such route conditions of the intended route or pathway 84 and/or the complicated route or pathway 102, and generate a set of desired articulation angles 54 based on the pathway analysis. Additionally, the machine parameter monitoring system 70 may provide the machine speed, gross load, net load, and other machine parameters which may be used by the electronic controller 60 when calculating or deriving the desired articulation angle 54.

In a next block 112, the electronic controller 60 may compare the desired articulation angle 54 against the actual articulation angle 54 to derive or otherwise determine an error for the desired articulation angle 54. In some embodiments, a threshold or margin for the error of the desired articulation angle 54, which is utilized to evaluate the relative significance of the error, may be located from a predetermined route or map. Additionally, the threshold or margin of error may be determined during a calibration process of the work machine 20. When the absolute value of the error is determined to be equal to or greater than the threshold or margin, the error is significant and a corrective action may be needed in order to mitigate the error.

After the electronic control system 64 determines the desired articulation angle 54 and the error of the desired articulation angle 54 for each articulation connection module 42, then in a next block 114, the electronic controller 60 may create a control signal based on the error of the desired articulation angle 54 to control the extension and retraction of the first and second articulation cylinders 46, 48 of each articulation connection module 42. In some embodiments, the control signal may control the actuation of the first and second articulation cylinders 46, 48 such that each articulation connection module 42 forms the desired articulation angle 54 between the lead machine module 22 and each trailing machine module 24. As a result, the lead machine module 22 and each of the one or more trailing machine modules 24 are precisely positioned relative to one another to steer and maneuver the work machine 20.

In a next block 116, the electronic controller 60 may transmit the control signal to the valve controller 72 which may control actuation of the first and second hydraulic control valves 56, 58. Alternatively, in some embodiments, the valve controller 72 may be integrated with the electronic controller 60 and the control signal is directly transmitted from the electronic controller 60 to the first and second hydraulic control valves 56, 58. The actuation of the first and second hydraulic control valves 56, 58 may control the flow of hydraulic fluid and cause the first and second articulation cylinders 46, 48 to extend and/or retract such that each articulation connection module 42 is adjusted to form the desired articulation angle 54.

In some embodiments, each of the first and second articulation cylinders 46, 48 may be coupled to an articulation position sensor 62 which may be configured to monitor the extension and/or retraction position of the respective first and second articulation cylinder 46, 48. Moreover, each articulation position sensor 62 may be communicably coupled to the electronic controller 60 and configured to transmit or otherwise communicate extension and/or retraction position of each of the first and second articulation cylinders 46, 48. As a result, in a next block 118 each articulation cylinder position sensor 62 is configured to monitor one of the first and second articulation cylinders 46, 48 and transmit or otherwise communicate the position data to the electronic controller 60.

In a next block 120, the electronic controller 60 may derive or otherwise calculate the actual articulation angle 54 based on each position of the first and second articulation cylinders 46, 48. As a result, the method 104 may return to block 112 and the electronic controller 60 may be configured to determine the error or difference between the actual articulation angle 54 of each articulation connection module 42 with the desired articulation angle 54. If the comparison or difference between the actual articulation angle 54 and the desired articulation angle 54 is within the predetermined threshold or margin, then no corrective action or adjustment by the electronic control system 64 may be needed. If the difference between the actual articulation angle 54 and desired articulation angle 54 is outside of the predetermined threshold or margin then the electronic control system 64 may transmit a corrective action for the steering and maneuvering of the work machine 20. Alternatively, if the difference between the actual articulation angle 54 and desired articulation angle 54 is outside of the predetermined threshold or margin, then the electronic control system 64 may return back to block 106 and the operator may alter the selection of the work machine 20 to operate in a fully automatic mode or a semi-automatic mode.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A control system for steering a work machine, the control system comprising:
   a steering input device configured to steer a lead machine module of the work machine;
   an articulation module disposed between the lead machine module and a trailing machine module, the articulation module configured to pivotally couple the lead machine module and the trailing machine module about an articulation module pivot point;
   a first articulation cylinder included in the articulation module and operably coupled to the lead machine module and the trailing machine module, the first articulation cylinder configured to actuate between a first cylinder first position and a first cylinder second position;
   a second articulation cylinder included in the articulation module and operably coupled to the lead machine module and the trailing machine module, the second articulation cylinder configured to actuate between a second cylinder first position and a second cylinder second position; and
   an electronic controller in electronic communication with the first articulation cylinder and the second articulation cylinder of the articulation module, the electronic controller programmed to transmit a control signal to each of the first articulation cylinder and the second articulation cylinder;
      the control signal being transmitted to cause the first articulation cylinder to actuate between the first cylinder first position and the first cylinder second position and to cause the second articulation cylinder to actuate between the second cylinder first position and the second cylinder second position such that the lead machine module and the trailing machine module each pivot about the articulation module pivot point;
      wherein the electronic controller includes an electronic route and location information system configured to receive a predefined route data set, wherein the electronic controller is programmed to transmit the control signal to the first articulation cylinder and the second articulation cylinder based on the predefined route data set.

2. The control system of claim 1, further comprising a first valve coupled to the first articulation cylinder and a second valve coupled to the second articulation cylinder; and
   wherein the control signal controls each of the first valve and the second valve such that the first articulation cylinder actuates in an opposite direction relative to the second articulation cylinder.

3. The control system of claim 1, wherein actuation of the first articulation cylinder and the second articulation cylinder forms an articulation angle between the lead machine module and the trailing machine module, the articulation angle being defined by an intersection of a lead machine longitudinal axis, of the lead machine module, with a trailing machine longitudinal axis, of the trailing machine module, at the articulation module pivot point.

4. The control system of claim 3, further comprising a first position sensor coupled to the first articulation cylinder and configured to monitor a first articulation cylinder position, a second position sensor coupled to the second articulation cylinder and configured to monitor a second articulation cylinder position, the first articulation cylinder position and the second articulation cylinder position transmitted to the electronic controller, and the electronic controller programmed to derive the articulation angle based on the first articulation cylinder position and the second articulation cylinder position.

5. The control system of claim 1, further including a machine parameter monitoring system in electronic communication with the electronic controller and configured to monitor and transmit at least one operation parameter to the electronic controller, and the electronic controller transmits the control signal to the first articulation cylinder and the second articulation cylinder based on the received at least one operation parameter of the work machine.

6. The control system of claim 1, wherein the electronic controller is operably selectable between an automatic operational mode and a semi-automatic operational mode, the automatic operational mode configured to instruct the electronic controller to automatically control the steering input device, the first articulation cylinder, and the second articulation cylinder, and the semi-automatic mode configured to allow manual control of the steering input device and automatic control of the first articulation cylinder and the second articulation cylinder.

7. A method of steering and maneuvering a work machine, the method comprising:
   coupling a lead machine module to a trailing machine module with an articulation module disposed between the lead machine module and the trailing machine module;
   attaching a first articulation cylinder of the articulation module to the lead machine module and the trailing machine module;
   attaching a second articulation cylinder of the articulation module to the lead machine module and the trailing machine module;
   programming a control signal with an electronic controller; and
   transmitting the control signal to actuate the first articulation cylinder and the second articulation cylinder between a first cylinder first position and a first cylinder second position and a second cylinder first position and a second cylinder second position;
   wherein the electronic controller is communicably coupled with an electronic route and location information system configured to receive a predefined route data set, and programming the control signal includes analyzing the predefined route data set and forming the control signal based on the predefined route data set.

8. The method of claim 7, further comprising a first valve coupled to the first articulation cylinder and a second valve coupled to the second articulation cylinder, wherein actuating the first articulation cylinder and the second articulation cylinder includes transmitting the control signal to the first valve and the second valve such that the first articulation cylinder actuates in an opposite direction relative to the second articulation cylinder.

9. The method of claim 7, wherein actuating the first articulation cylinder and the second articulation cylinder includes forming an articulation angle between the lead machine module and the trailing machine module and defining the articulation angle by an intersection of a lead machine longitudinal axis and a trailing machine longitudinal axis at an articulation module pivot point.

10. The method of claim 9, further comprising a first position sensor coupled to the first articulation cylinder configured to monitor a first articulation cylinder position, a second position sensor coupled to the second articulation cylinder configured to monitor a second articulation cylinder position, transmitting the first articulation cylinder position and the second articulation cylinder position to the electronic controller and deriving the articulation angle based on the first articulation cylinder position and the second articulation cylinder position received by the electronic controller.

11. The method of claim 7, further including a machine parameter monitoring system communicably coupled to the electronic controller and configured to monitor and transmit at least one operation parameter to the electronic controller, and transmitting the control signal to the first articulation cylinder and the second articulation cylinder based on the received at least one operation parameter of the work machine.

12. The method of claim 7, wherein the electronic controller is operably selectable between an automatic operational mode and a semi-automatic operational mode, the automatic operational mode configured to instruct the electronic controller to automatically control a steering input device, the first articulation cylinder, and the second articulation cylinder, and the semi-automatic mode configured to allow manual control of the steering input device and automatic control of the first articulation cylinder and the second articulation cylinder.

13. A work machine, comprising:
a lead machine module including a steering input device configured to steer the work machine;
at least one trailing machine module positioned behind the lead machine module and arranged in a train-like configuration;
an articulation module disposed between the lead machine module and the at least one trailing machine module, the articulation module configured to pivotally couple the lead machine module and the at least one trailing machine module such that the lead machine module and the at least one trailing machine module pivot about an articulation module pivot point;
a first articulation cylinder included in the articulation module and operably coupled to the lead machine module and the at least one trailing machine module, the first articulation cylinder configured to actuate between a first cylinder first position and a first cylinder second position;
a second articulation cylinder included in the articulation module and operably coupled to the lead machine module and the at least one trailing machine module, the second articulation cylinder configured to actuate between a second cylinder first position and a second cylinder second position; and
an electronic controller in electronic communication with the first articulation cylinder and the second articulation cylinder of the articulation module, the electronic controller programmed to transmit a control signal to each of the first articulation cylinder and the second articulation cylinder;
the control signal being transmitted to cause the first articulation cylinder to actuate between the first cylinder first position and the first cylinder second position and to cause the second articulation cylinder to actuate between the second cylinder first position and the second cylinder second position such that the lead machine module and the at least one trailing machine module pivot with respect to one another about the articulation module pivot point;
wherein the electronic controller is selectable between an automatic operational mode configured to instruct the electronic controller to automatically control the steering input device, the first articulation cylinder and the second articulation cylinder, and a semi-automatic operational mode configured to allow manual control of the steering input device and automatic control of the first articulation cylinder and the second articulation cylinder.

14. The work machine of claim 13, further comprising a first valve coupled to the first articulation cylinder and a second valve coupled to the second articulation cylinder; and
wherein the control signal configured to control each of the first valve and the second valve such that the first articulation cylinder actuates in a opposite direction relative to the second articulation cylinder.

15. The work machine of claim 13, wherein actuation of the first articulation cylinder and the second articulation cylinder forms an articulation angle between the lead machine module and the trailing machine module, the articulation angle being defined by an intersection of a lead machine longitudinal axis, of the lead machine module, with a trailing machine longitudinal axis, of the trailing machine module, at the articulation module pivot point.

16. The work machine of claim 15, further comprising a first position sensor coupled to the first articulation cylinder and configured to monitor a first articulation cylinder position, a second position sensor coupled to the second articulation cylinder and configured to monitor a second articulation cylinder position, the first articulation cylinder position and the second articulation cylinder position transmitted to the electronic controller, and the electronic controller programmed to derive the articulation angle based on the first articulation cylinder position and the second articulation cylinder position received by the electronic controller.

17. The work machine of claim 16, wherein the electronic controller is communicably coupled with an electronic route and location information system and a machine parameter monitoring system which is configured to respectively transmit a predefined route data set and at least one machine parameter to the electronic controller, wherein the electronic controller analyzes the predefined route data set and the at least one machine parameter and creates the control signal based on the predefined route data set and the at least one machine parameter.

* * * * *